United States Patent
Slater et al.

(10) Patent No.: US 9,438,293 B2
(45) Date of Patent: Sep. 6, 2016

(54) TUNABLE CIRCUIT ELEMENTS FOR DYNAMIC, PER ELEMENT POWER

(71) Applicant: GOOGLE TECHNOLOGY HOLDINGS LLC, Mountain View, CA (US)

(72) Inventors: Matthew J. Slater, Elmhurst, IL (US); Mohammed R. Abdul-Gaffoor, Palatine, IL (US); Graham R. Alvey, Chicago, IL (US); Md Rashidul Islam, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/451,950

(22) Filed: Aug. 5, 2014

(65) Prior Publication Data

US 2016/0043752 A1    Feb. 11, 2016

(51) Int. Cl.
*H04B 1/04* (2006.01)
*H04B 1/3827* (2015.01)

(52) U.S. Cl.
CPC .......... *H04B 1/3838* (2013.01); *H04B 1/0458* (2013.01); *H04B 2001/0416* (2013.01)

(58) Field of Classification Search
CPC ...... H04B 1/0458; H04B 1/18; H04B 1/719; H04B 1/38; H04B 1/71635; H04B 1/04; H04B 1/3838; H04B 7/06; H04B 2001/0416; H01Q 13/103; H01Q 15/0033; H01S 5/1032; H04W 52/367; H04W 52/146; H04W 52/246
USPC ........... 375/295, 296, 297; 455/114.2, 114.3, 455/91, 129; 343/700 R, 822, 820, 793, 850, 343/860
See application file for complete search history.

(56) References Cited

U.S. PATENT DOCUMENTS

| | | | |
|---|---|---|---|
| 2,499,663 | A | 3/1950 | Medlar |
| 2,529,038 | A | 11/1950 | Medlar et al. |

(Continued)

FOREIGN PATENT DOCUMENTS

| | | |
|---|---|---|
| DE | 10118189 | 11/2002 |
| EP | 1298809 A2 | 9/2002 |

(Continued)

OTHER PUBLICATIONS

"3GTPP TS 36.213 V9.3.0 3rd Generation Partnership Project Technical Specification Group Radio Access Network", Evolved Universal Terrestrial Radio Access (E-UTRA); Physical layer procedures (Release 9), Sep. 2010, 80 pages.

(Continued)

*Primary Examiner* — Vineeta Panwalkar
(74) *Attorney, Agent, or Firm* — Wolfe-SBMC

(57) ABSTRACT

A communication device and method mitigates specific absorption rate (SAR) exposure of a user. A radio frequency (RF) transmitter amplifies outgoing communication signals to a total radiated power (TRP) level. A matching network electrically connected to the RF transmitter receives the outgoing communication signals. The matching network divides the TRP level of received, outgoing communication signals to a first power level at a first network output and to a second power level at a second network output. First and second antennas electrically connected respectively to the first and second network output radiate the divided, outgoing communication signals at the first and second power levels. A SAR controller communicatively connected to the matching network controls the matching network to shift transmit power between the first and second antennas while maintaining TRP level to reduce SAR exposure of the user.

20 Claims, 6 Drawing Sheets

(56) References Cited

U.S. PATENT DOCUMENTS

| | | |
|---|---|---|
| 2,563,234 A | 8/1951 | Godshalk et al. |
| 2,627,060 A | 1/1953 | Berg |
| 2,637,836 A | 5/1953 | Kendall et al. |
| 3,678,363 A | 7/1972 | Ringle |
| 4,061,956 A | 12/1977 | Brown et al. |
| 4,082,097 A | 4/1978 | Mann et al. |
| 4,629,965 A | 12/1986 | Fallon et al. |
| 4,649,333 A | 3/1987 | Moore |
| 4,692,682 A | 9/1987 | Lane et al. |
| 4,712,055 A | 12/1987 | Houser, Jr. |
| 4,727,306 A | 2/1988 | Misak et al. |
| 4,745,349 A | 5/1988 | Palanisamy et al. |
| 5,012,176 A | 4/1991 | LaForge |
| 5,136,231 A | 8/1992 | Faulk |
| 5,166,596 A | 11/1992 | Goedken |
| 5,172,044 A | 12/1992 | Sasaki et al. |
| 5,179,335 A | 1/1993 | Nor |
| 5,185,566 A | 2/1993 | Goedken |
| 5,363,031 A | 11/1994 | Miller et al. |
| 5,481,175 A | 1/1996 | Qualich et al. |
| 5,504,416 A | 4/1996 | Holloway et al. |
| 5,523,667 A | 6/1996 | Feldstein |
| 5,600,230 A | 2/1997 | Dunstan |
| 5,640,059 A | 6/1997 | Kammiller et al. |
| 5,656,920 A | 8/1997 | Cherng et al. |
| 5,731,694 A | 3/1998 | Wilcox et al. |
| 5,736,834 A | 4/1998 | Kuno |
| 5,804,944 A | 9/1998 | Alberkrack et al. |
| 5,815,389 A | 9/1998 | Plow et al. |
| 5,900,718 A | 5/1999 | Tsenter |
| 6,094,033 A | 7/2000 | Ding et al. |
| 6,144,186 A | 11/2000 | Thandiwe et al. |
| 6,236,189 B1 | 5/2001 | Franke |
| 6,275,006 B1 | 8/2001 | Kolke et al. |
| 6,298,233 B1 | 10/2001 | Souissi |
| 6,330,455 B1 | 12/2001 | Ichihara |
| 6,470,003 B1 | 10/2002 | Smith et al. |
| 6,495,992 B1 | 12/2002 | Pavlovic |
| 6,639,462 B1 | 10/2003 | Luu |
| 6,771,051 B2 | 8/2004 | Oglesbee et al. |
| 6,803,746 B2 | 10/2004 | Aker et al. |
| 6,850,040 B2 | 2/2005 | Xiong et al. |
| 6,917,182 B2 | 7/2005 | Burton et al. |
| 6,927,555 B2 | 8/2005 | Johnson |
| 7,146,139 B2 | 12/2006 | Nevermann |
| 7,151,411 B2 | 12/2006 | Martin et al. |
| 7,158,804 B2 | 1/2007 | Kumaran et al. |
| 7,170,341 B2 | 1/2007 | Conrad et al. |
| 7,301,308 B2 | 11/2007 | Aker et al. |
| 7,549,177 B2 | 6/2009 | Diefenbaugh et al. |
| 7,724,194 B2 | 5/2010 | Black et al. |
| 8,013,674 B2 | 9/2011 | Drogi et al. |
| 8,054,039 B2 | 11/2011 | Bauerle et al. |
| 8,155,081 B1 | 4/2012 | Mater et al. |
| 8,204,446 B2 | 6/2012 | Scheer et al. |
| 8,232,685 B2 | 7/2012 | Perper et al. |
| 8,269,467 B2 | 9/2012 | Li et al. |
| 8,278,871 B2 | 10/2012 | Kallmyer |
| 8,288,994 B2 | 10/2012 | Jakes et al. |
| 8,427,011 B2 | 4/2013 | Jung et al. |
| 8,436,492 B2 | 5/2013 | Jung et al. |
| 8,538,428 B2 | 9/2013 | Bartlett |
| 8,552,593 B2 | 10/2013 | Jung et al. |
| 8,552,693 B2 | 10/2013 | Paryani |
| 8,592,065 B2 | 11/2013 | Bhardwaj et al. |
| 8,624,546 B2 | 1/2014 | Jung et al. |
| 8,643,342 B2 | 2/2014 | Mehta et al. |
| 8,754,614 B2 | 6/2014 | Paryani et al. |
| 8,760,010 B2 | 6/2014 | Jung et al. |
| 8,805,764 B1 | 8/2014 | Rhines et al. |
| 9,246,454 B2 | 1/2016 | Schirmann et al. |
| 9,356,461 B2 | 5/2016 | Howard et al. |
| 2001/0017602 A1 | 8/2001 | Hieb |
| 2003/0085684 A1 | 5/2003 | Tsukamoto et al. |
| 2003/0189417 A1 | 10/2003 | Dias et al. |
| 2003/0228875 A1 | 12/2003 | Alapuranen |
| 2003/0228891 A1 | 12/2003 | Kobayashi et al. |
| 2004/0075494 A1 | 4/2004 | Klomsdorf et al. |
| 2004/0117330 A1 | 6/2004 | Ehlers et al. |
| 2004/0176125 A1 | 9/2004 | Lee |
| 2004/0222769 A1 | 11/2004 | Al-Anbuky et al. |
| 2004/0257040 A1 | 12/2004 | Xiong et al. |
| 2005/0017677 A1 | 1/2005 | Burton et al. |
| 2005/0030094 A1 | 2/2005 | Conrad et al. |
| 2005/0046387 A1 | 3/2005 | Aker et al. |
| 2005/0168193 A1 | 8/2005 | Xiong et al. |
| 2005/0253561 A1 | 11/2005 | Tibbs |
| 2006/0028176 A1 | 2/2006 | Tang et al. |
| 2006/0158156 A1 | 7/2006 | Gamboa |
| 2006/0269835 A1 | 11/2006 | Song |
| 2007/0069735 A1 | 3/2007 | Graf et al. |
| 2007/0188139 A1 | 8/2007 | Hussain et al. |
| 2008/0074084 A1 | 3/2008 | Lee et al. |
| 2008/0154624 A1 | 6/2008 | O'Neil |
| 2008/0197711 A1 | 8/2008 | Kato et al. |
| 2008/0211455 A1 | 9/2008 | Park et al. |
| 2008/0303480 A1 | 12/2008 | Prutchi et al. |
| 2009/0102294 A1 | 4/2009 | Hodges et al. |
| 2009/0131074 A1 | 5/2009 | Minier |
| 2009/0206797 A1 | 8/2009 | Chueh et al. |
| 2009/0295226 A1 | 12/2009 | Hodges et al. |
| 2010/0033138 A1 | 2/2010 | Alger et al. |
| 2010/0085010 A1 | 4/2010 | Suzuki et al. |
| 2010/0127666 A1 | 5/2010 | Ball |
| 2010/0127889 A1 | 5/2010 | Vogel et al. |
| 2010/0156355 A1 | 6/2010 | Bauerle et al. |
| 2010/0198423 A1 | 8/2010 | Hirst |
| 2010/0198713 A1 | 8/2010 | Forbes et al. |
| 2010/0225272 A1 | 9/2010 | Kirby et al. |
| 2010/0233989 A1 | 9/2010 | Constien et al. |
| 2010/0266066 A1 | 10/2010 | Takahashi |
| 2010/0283691 A1* | 11/2010 | Su et al. .................. 343/702 |
| 2011/0012562 A1 | 1/2011 | Paryani |
| 2011/0018346 A1 | 1/2011 | Dixon |
| 2011/0037439 A1 | 2/2011 | Bhardwaj et al. |
| 2011/0070848 A1 | 3/2011 | Reddy |
| 2011/0071597 A1 | 3/2011 | Aghassian |
| 2011/0090126 A1 | 4/2011 | Szini et al. |
| 2011/0119005 A1 | 5/2011 | Majima et al. |
| 2011/0121836 A1 | 5/2011 | Kim et al. |
| 2011/0140538 A1 | 6/2011 | Jung et al. |
| 2011/0151942 A1 | 6/2011 | Hanley et al. |
| 2011/0156661 A1 | 6/2011 | Mehta et al. |
| 2011/0222469 A1 | 9/2011 | Ali et al. |
| 2011/0275369 A1 | 11/2011 | Bartlett et al. |
| 2011/0291619 A1 | 12/2011 | Asakura |
| 2011/0316475 A1 | 12/2011 | Jung et al. |
| 2012/0021800 A1 | 1/2012 | Wilson et al. |
| 2012/0032646 A1 | 2/2012 | Lee |
| 2012/0071195 A1 | 3/2012 | Chakraborty et al. |
| 2012/0146576 A1 | 6/2012 | Partovi |
| 2012/0147801 A1 | 6/2012 | Ho et al. |
| 2012/0210325 A1 | 8/2012 | de Lind van Wijngaarden et al. |
| 2012/0213172 A1 | 8/2012 | Kim et al. |
| 2012/0235636 A1 | 9/2012 | Partovi |
| 2012/0242906 A1 | 9/2012 | Shintani et al. |
| 2013/0020862 A1 | 1/2013 | Miller |
| 2013/0069658 A1 | 3/2013 | Rich et al. |
| 2013/0121194 A1 | 5/2013 | Heshmati |
| 2013/0122827 A1* | 5/2013 | Ali et al. .................. 455/77 |
| 2013/0169348 A1 | 7/2013 | Shi |
| 2013/0237254 A1 | 9/2013 | Papakipos et al. |
| 2013/0249479 A1 | 9/2013 | Partovi |
| 2013/0257359 A1 | 10/2013 | Sakai et al. |
| 2014/0068288 A1 | 3/2014 | Robinson et al. |
| 2014/0070761 A1 | 3/2014 | Labbe et al. |
| 2014/0070762 A1 | 3/2014 | Jenwatanavet et al. |
| 2014/0084856 A1 | 3/2014 | Howard et al. |
| 2014/0092243 A1 | 4/2014 | Ichikawa |
| 2014/0097671 A1 | 4/2014 | Nakamura et al. |
| 2014/0176067 A1 | 6/2014 | Suzuki et al. |
| 2014/0232330 A1 | 8/2014 | Robertson et al. |
| 2014/0253023 A1 | 9/2014 | Paryani |
| 2014/0266462 A1 | 9/2014 | Schirmann et al. |

(56) References Cited

U.S. PATENT DOCUMENTS

| | | |
|---|---|---|
| 2014/0274188 A1 | 9/2014 | Thorson et al. |
| 2015/0064528 A1 | 3/2015 | Liu et al. |
| 2015/0234054 A1 | 8/2015 | Lennen et al. |
| 2015/0349372 A1 | 12/2015 | Maleki et al. |
| 2015/0379533 A1 | 12/2015 | Alberth et al. |
| 2016/0072326 A1 | 3/2016 | Nilles |

FOREIGN PATENT DOCUMENTS

| | | |
|---|---|---|
| EP | 1505725 | 7/2009 |
| EP | 2077682 | 7/2009 |
| EP | 2222371 | 5/2011 |
| EP | 2595269 | 5/2013 |
| JP | H09247852 | 9/1997 |
| JP | 2003333200 | 11/2003 |
| WO | WO-9306682 | 4/1993 |
| WO | WO-2011084367 | 7/2011 |
| WO | WO-2011090769 | 7/2011 |
| WO | WO-2013152149 | 10/2013 |

OTHER PUBLICATIONS

Ex Parte Quayle Action, U.S. Appl. No. 13/625,976, Dec. 11, 2015, 11 pages.
Ex Parte Quayle Action, U.S. Appl. No. 14/108,544, Apr. 23, 2015, 8 pages.
Final Office Action, U.S. Appl. No. 13/477,609, Jul. 31, 2015, 11 pages.
Final Office Action, U.S. Appl. No. 13/625,976, Jun. 5, 2015, 40 pages.
Final Office Action, U.S. Appl. No. 13/798,682, Jul. 30, 2015, 12 pages.
First Choice Power, http://www.firstchoicepower.com/plans-services/electricity-plans/variable-rate-electricity-plans.aspx—Retrieved on May 18, 2012, 1 page.
"How Does Prepaid Electricity Work", http://www.mxenergy.com/does-prepaid-electricity-work-a-19.html—Retrieved on Jan. 15, 2012, 3 pages.
"International Preliminary Report on Patentability", Application No. PCT/US2013/054623, Apr. 9, 2015, 12 pages.
"International Preliminary Report on Patentability", Application No. PCT/US2013/060170, Mar. 24, 2015, 6 pages.
"International Preliminary Report on Patentability", Application No. PCT/US2013/042042, Mar. 10, 2015, 8 pages.
"International Preliminary Report on Patentability", Application No. PCT/US2014/014994, Sep. 15, 2015, 8 pages.
"International Search Report and Written Opinion", Application No. PCT/US2014/070384, Mar. 13, 2015, 12 pages.
"International Search Report and Written Opinion", Application No. PCT/US2014/014994, Mar. 21, 2014, 12 pages.
"International Search Report and Written Opinion", Application No. PCT/US2013/054623, May 14, 2014, 14 pages.
"International Search Report and Written Opinion", Application No. PCT/US2013/040242, Oct. 4, 2013, 14 pages.
"International Search Report and Written Opinion", Application No. PCT/US2014/018479, Jul. 22, 2014, 17 pages.
"International Search Report and Written Opinion", Application No. PCT/US2013/060170, Dec. 5, 2013, 8 pages.
Non-Final Office Action, U.S. Appl. No. 13/477,609, Dec. 3, 2014, 7 pages.
Non-Final Office Action, U.S. Appl. No. 13/477,609, Dec. 14, 2015, 9 pages.
Non-Final Office Action, U.S. Appl. No. 13/621,857, Nov. 14, 2014, 5 pages.
Non-Final Office Action, U.S. Appl. No. 13/625,976, Feb. 5, 2015, 38 pages.
Non-Final Office Action, U.S. Appl. No. 13/798,682, Feb. 17, 2015, 10 pages.
Non-Final Office Action, U.S. Appl. No. 13/798,682, Dec. 4, 2015, 13 pages.
Non-Final Office Action, U.S. Appl. No. 14/457,190, Sep. 18, 2015, 25 pages.
Notice of Allowance, U.S. Appl. No. 13/621,857, Jan. 26, 2015, 7 pages.
Notice of Allowance, U.S. Appl. No. 13/621,857, May 11, 2015, 5 pages.
Notice of Allowance, U.S. Appl. No. 14/108,544, Oct. 15, 2015, 6 pages.
Restriction Requirement, U.S. Appl. No. 13/621,857, Aug. 18, 2014, 7 pages.
"Your Choice Your Plan", GreyStone Power Corporation, http://www.greystonepower.com/UploadedFiles/pdf/prepaid%20brochure.pdf—Retrieved on Jun. 4, 2012, 2 pages.
Park,"Energy Maps for Large-scale, Mobile Wireless Networks", IEEE International Conference on Communications, 2007, Jun. 24, 2007, 6 pages.
Corrected Notice of Allowance, U.S. Appl. No. 13/625,976, May 4, 2016, 2 pages.
Final Office Action, U.S. Appl. No. 14/457,190, Mar. 3, 2016, 33 pages.
Non-Final Office Action, U.S. Appl. No. 14/293,182, May 20, 2016, 10 pages.
Notice of Allowance, U.S. Appl. No. 13/477,609, Apr. 11, 2016, 5 pages.
Notice of Allowance, U.S. Appl. No. 13/625,976, Mar. 3, 2016, 8 pages.
Supplemental Notice of Allowance, U.S. Appl. No. 13/625,976, Mar. 24, 2016, 5 pages.
Notice of Allowance, U.S. Appl. No. 13/798,682, Jun. 20, 2016, 10 pages.
Notice of Allowance, U.S. Appl. No. 14/479,679, Jun. 21, 2016, 9 pages.
Supplemental Notice of Allowance, U.S. Appl. No. 13/477,609, Jun. 16, 2016, 2 pages.

* cited by examiner

TUNABLE CIRCUIT ELEMENTS FOR DYNAMIC, PER ELEMENT POWER

BACKGROUND

1. Technical Field

The present disclosure generally relates to electronic communication devices and in particular to electronic communication devices having dual antennas that can both transmit communication signals.

2. Description of the Related Art

Two-way communication devices, such as mobile telephones, two-way radios, and personal digital assistants, each use antennas to transmit and receive radio frequency (RF) communication signals. These antennas communicate with wide area network towers, local area network base stations, and even other devices directly, to transmit and receive data. The antennas allow the device to be truly wireless, in that all communication may occur through the air. Communication systems often optimize for total radiated power (TRP) and total isotropic sensitivity (TIS) in as many use cases as possible, such as free-space, handheld, and held to the ear. The TRP and TIS figures of merit combine conducted power levels or conducted sensitivity levels, respectively, with the antenna system efficiencies. The values provide a first-order estimation of how effective the communication device will be at maintaining a good quality of service. Generally-known methods for optimizing TRP include increasing the conducted power delivered to the antenna system or methods to improve the efficiency of the antenna system itself. Generally-known methods for optimizing TIS include improving the conducted sensitivity threshold or methods to improve the efficiency of the antenna system itself.

In optimizing TRP, the specific absorption rate (SAR) exposure of the user remains a topic of concern, and simply enhancing the TRP detrimentally impacts the SAR level also. Attempts to automatically mitigate SAR exposure of a user of a communication device who is using it in this manner have generally utilized the power control of the power amplifier of the RF front end, reducing the TRP level. While mitigating SAR exposure to an extent, such power reductions can reduce the quality of service (QoS) of the communication session. Similarly, the use case conditions in which SAR mitigation are required, i.e., held to the ear, impact the TIS of the device by naturally diminishing the efficiency of the antenna system.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

Figure 1:
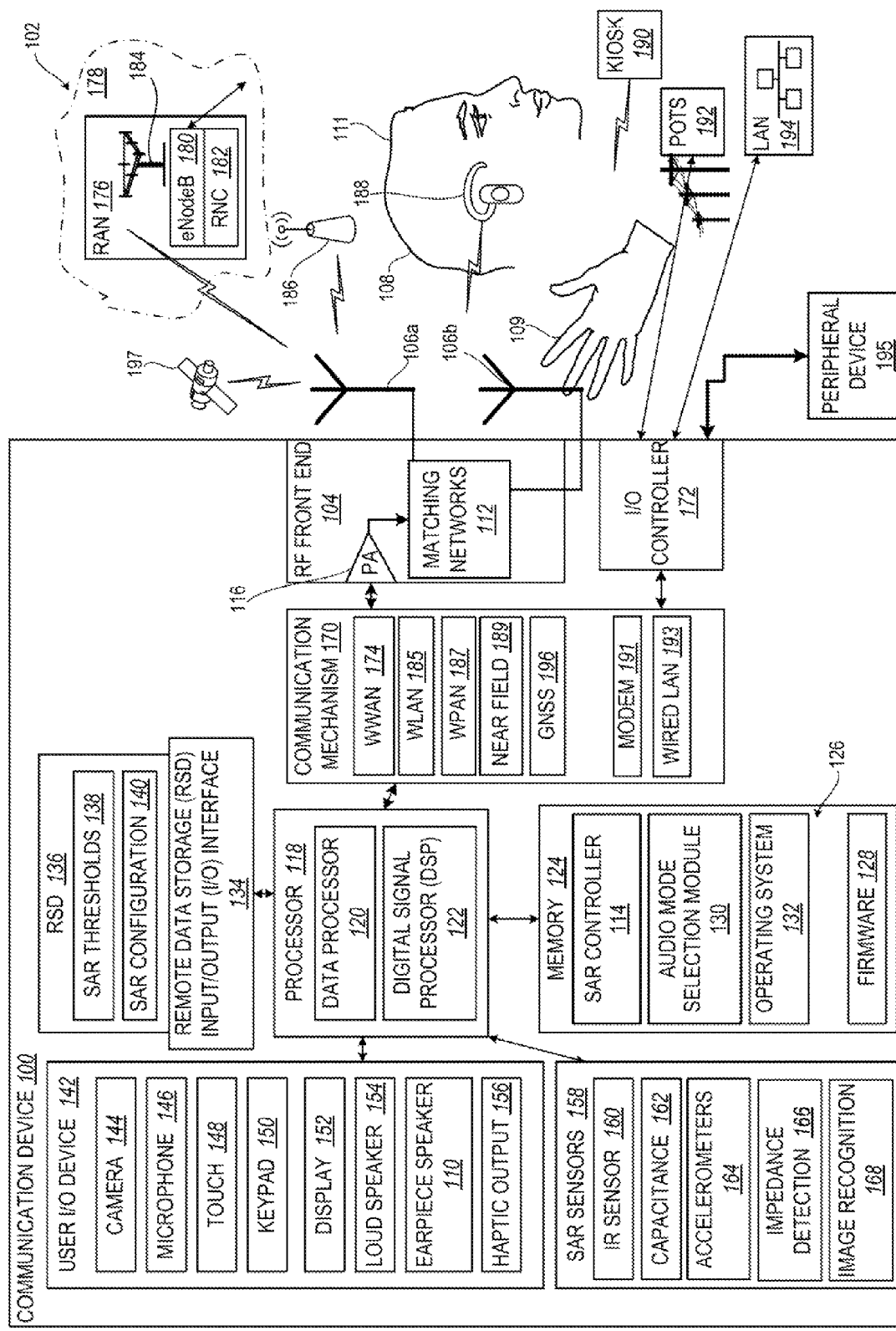
FIG. 1 illustrates a block diagram representation of an example communication device having a radio frequency (RF) front end with de-tunable antennas for mitigating specific absorption rate (SAR) exposure, according to one embodiment.

The illustrative embodiments of the present disclosure provide a method and communication device that maintains an acceptable QoS in as many use cases as possible while managing the specific absorption rates (SAR) from a communication device. The communication device can tune one antenna to perform more or all of the transition and in coordination detune another antenna while maintaining the same level of amplification from the power amplifier and thus total radiated power (TRP).

According to one aspect, a communication device includes a radio frequency (RF) transmitter that amplifies outgoing communication signals to a TRP level. A matching network is electrically connected to the RF transmitter. The matching network divides the TRP level of received, outgoing communication signals into a first power level at a first network output and to a second power level at a second network output. First and second antennas are electrically connected respectively to the first and second network output. The first and second antennas radiate the divided, outgoing communication signals at the first and second power levels respectively. A SAR controller is communicatively connected to the transmitter and the matching network. The SAR controller controls the matching network to reduce SAR exposure of a user by shifting transmit power levels between the first and second antennas, while maintaining the TRP level. The concept is easily expanded from two network outputs and two antenna elements to a plurality of network outputs and a plurality of antenna elements.

In at least one embodiment, the present disclosure provides a method for mitigating SAR exposure of a user of a communication device. The method includes amplifying outgoing communication signals to a TRP level. The method further includes dividing the TRP level of communication signals into a first power level at a first network output and to a second power level at a second network output. The method includes radiating the divided, outgoing communication signals at the first and second power levels via a first and second antenna respectively connected to the first and second network outputs. The method further includes deterministically optimizing radiated QoS by frequency shifting at least one of the first or second matching networks for total isotropic sensitivity (TIS) performance. The frequency shifted matching network will decrease the power delivered to the transmitting antenna system due to mismatch at transmitting frequencies. The power lost in the mismatched matching network regulates the SAR contributions for that antenna element.

In one aspect, the present innovation maintains QoS by TRP or TIS on a per antenna element basis while managing the SAR contributions each antenna element. SAR reduction may be included. Alternatively, optimization may be performed up to a SAR threshold value. In particular, optimization can be based on which antenna element can be optimized most for TRP versus which antenna element can be optimized for TIS.

As communication devices become more complex, communication signals can be routed for transmission from a single power amplifier to multiple antennas. Matching networks include active elements to dynamically change the performance of the antennas. Functionality is primarily used to improve the antenna match for each band or to account for loading such as from the user's hand on one of the antennas.

In situations where the transmit power from one of these antennas is too high, the traditional method for reducing power is to cutback the amplification from the power amplifier. If power cutback is needed on only one antenna, generally-known systems cut back power to all antennas routed from the same power amplifier. In a communication device with multiple transmit antennas, the present disclosure recognizes that it may be beneficial to selectively cut back power on individual elements mitigating SAR exposure. The present innovation allows for power cutback in communication devices having multiple antennas that are fed by a common power amplifier. In particular, the present innovation uses variable components in the matching networks of the antenna to selectively detune an antenna. The communication device can tune one antenna to perform more or all of the transmission and in coordination detune another antenna that creates SAR exposure to maintain the same level of amplification from the power amplifier and thus maintain the total radiated power (TRP).

In the following detailed description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Turning now to FIG. 1, there is depicted a block diagram representation of an example communication device 100 within which several of the features of the disclosure can be implemented. In an exemplary aspect, the communication device 100 includes the hardware and software to support the various wireless or wired communication functions as part of a communication system 102. According to the general illustration, the communication device 100 includes a radio frequency (RF) front end 104 that transmits via two or more antennas. For clarity, FIG. 1 illustrates a top antenna 106a and a bottom antenna 106b. For example, two antennas 106a-106b can provide spatial diversity for dynamically providing antenna gain in a particular direction. As another example, certain communication devices 100 that are intended for handheld use can experience impedance loading to bottom antenna 106b due to proximity of a portion of a user 108, such as a user's hand 109. Having two antennas 106a-106b can increase the likelihood of at least one antenna 106a-106b being effective for transmitting. The example communication device 100 can output audio to a user 108 via earpiece speaker 110 during a two-way communication session. During such use, the user 108 can be exposed to SAR from the top antenna 106a that is closest to the head 111 of the user 108. The earpiece speaker 110 is oriented to be placed to the user's 108 ear and outputs audio at a volume appropriate for this proximity.

The present innovation leverages a capability of elements of matching networks 112 to degrade the antenna match. When multiple antennas 106a-106b are utilized, dynamic power cutback per antenna 106a-106b can be achieved by actively tuning the matching networks 112. In compliance testing, a SAR controller 114 can dynamically cut back the transmit power from one antenna 106a-106b while leaving the other antenna 106a-106b at full power by using the matching networks 112, thereby mitigating SAR exposure. A limiting case of dynamic cut back is completely detuning an antenna 106a-106b, i.e., essentially switching the antenna off. For example, this switching off can be implemented with PIN diode switches, varactor elements, capacitor banks, etc. By tuning one antenna 106a-106b to transmit and the other antenna 106a-106b to receive, the SAR controller 114 need not change a total radiated power (TRP) of the RF front end 104. An unchanged transmit power level of an RF transmitter, depicted as a power amplifier (PA) 116 of the RF front end 104, can be maintained for effective transmission within the communication system 102.

An added advantage of this type of scheme of detuning antennas 106a-106b is that the scheme can be used to favor transmit (Tx) or receive (Rx) on a per element basis. For example, this scheme can be used in a split Tx system, where the power is divided evenly between the top and bottom antennas 106a-106b. In the case that the top antenna 106a is near the user's head 111, the antenna match is tuned away from the Tx channel and toward the Rx channel. By doing this, the antenna 106a that poses a risk for SAR exposure of the user 108 can still function as an Rx antenna while simultaneously having the Tx cutback effect. SAR controller 114 can independently, or in coordination, tune matching networks 112 for each antenna 106a-106b. SAR controller 114 can also coordinate tuning of matching networks 112 for each antenna 106a-106b to maintain TRP level. An example of when coordination would be useful is in the case where SAR cutback is required on the top antenna 106a closest to the user's head 111. The Tx power of that antenna 106a can be reduced, favoring Rx operation. Meanwhile, the bottom antenna 106b further from the head can be tuned away from Rx towards Tx operation to maintain higher TRP.

Referring now to the specific component makeup and the associated functionality of the presented components, the communication device 100 can include an integrated circuit (IC) processor 118 that executes the SAR controller 114. The processor 118 can include one or more programmable microprocessors, such as a data processor 120 and a digital signal processor (DSP) 122, which may both be integrated into a single processing device, in some embodiments. The processor 118 controls the communication, user interface, and other functions and/or operations of the communication device 100. These functions and/or operations thus include, but are not limited to, application data processing and signal processing. The present innovation can be implemented using hardware component equivalents such as special purpose hardware, dedicated processors, general purpose computers, microprocessor based computers, micro-controllers, optical computers, analog computers, dedicated processors and/or dedicated hard wired logic. The communication device 100 can be one of a host of different types of devices, including but not limited to, a mobile cellular phone or smart-phone, a cordless phone, a desktop computer, a laptop, a net-book, an ultra-book, and/or a tablet computing device.

Memory 124 is connected to processor 118 and can include volatile memory and/or non-volatile memory that store software code such as software 126 and/or firmware 128. One or more executable applications can be stored within memory 124 for execution by the processor 118. The SAR controller 114 can be integral with the RF front end 104. For another example, memory 124 is illustrated as containing the SAR controller 114, an audio mode selection module 130 and an operating system 132. The memory 124 may be augmented by data storage, illustrated as a removable storage device (RSD) input/output (I/O) interface 134 that receives a RSD 136. For example, the SAR controller 114 can be provisioned with and update data structures including (i) SAR thresholds 138 for determining SAR trigger conditions and (ii) SAR configuration settings for the matching networks 112. The associated functionality and/or usage of each of the software modules will be described in greater detail within the descriptions which follow. In particular, the functionality associated with SAR controller 114 is described in greater detail within the description of the flow charts of FIGS. 5-6, and other figures.

Communication device 100 includes input/output (I/O) devices 142 for interacting with the user 108. The I/O devices 142 can include one or more input devices, such as camera 144, microphone 146, touch screen and/or touch pad 148, and keypad 150. The I/O devices 142 can also have one or more output devices, such as display 152, loud speaker 154, the earpiece speaker 110, and haptic output device 156. The I/O devices 142 can provide information to the SAR controller 114 that indicate that the user 108 is using the communication device 100 in a way that poses a risk of SAR exposure. The communication device 100 can also include SAR sensors 158, such as an IR sensor 160 for detecting proximity to the user 108, a capacitance sensor 162 for detecting touch by the user 108, accelerometers for detecting orientation and motion of the communication device 100, an impedance detection sensor 166 for detecting antenna loading, and an image recognition sensor 168 for recognizing a portion of the user 108 that indicates earpiece use or hands-free use.

A communication mechanism 170 can convert information from the processor 118 or an appropriate communication protocol for wireless transmission by the RF front end 104 or wired transmission by an I/O controller 172. The communication mechanism can convert a received communication signals encoded for a communication protocol from the RF front end 104 or I/O controller 172 to information usable by the processor 118. The communication mechanism 170 can include one or more communication components, including wireless wide area network (WWAN) transceiver 174 to communicate with a radio access network (RAN) 176 of a cellular network 178. The RAN 176 is generally represented as including a base station, depicted as an evolved base node ("eNodeB") 180 controlled by a radio network controller (RNC) 182 that transmits and receives over a base station antenna 184.

Alternatively, or in addition to a WWAN transceiver 174, communication mechanism 170 can include a wireless local area network (WLAN) module 185 to communicate with wireless devices and network accessible via a wireless access point 186. As an example, the WLAN module 185 may support IEEE 102.11 standards to detect that wireless access point 186 is a WiFi hotspot. Alternatively or in addition, the communication mechanism 170 can include a wireless personal area network (WPAN) transceiver 187 for communication with WPAN devices, depicted as a Bluetooth® headset 188 whose use would be indicative of hands-free use. Alternatively or in addition, the communication mechanism 170 can include a near field communication (NFC) transceiver module 189, such as can be utilized for exchanging files with another user device or a payment kiosk 190. As further illustrated, communication device 100 can also include components for wired communication over the I/O controller 172, such as modem 191 for communicating over a plain old telephone system (POTS) 192 and wired local area network (LAN) interface 193 such as an Ethernet module for connecting to a local area network (LAN) 194. The I/O controller 172 can also serve to connect to wired peripheral devices 195. A global navigation satellite system (GNSS) receiver 196 of the communication mechanism 170 can receive signals from GNSS satellites 197 via the RF front end 104 in order to provide location data. Global Positioning System (GPS) is one example of a GNSS.

Figure 2:
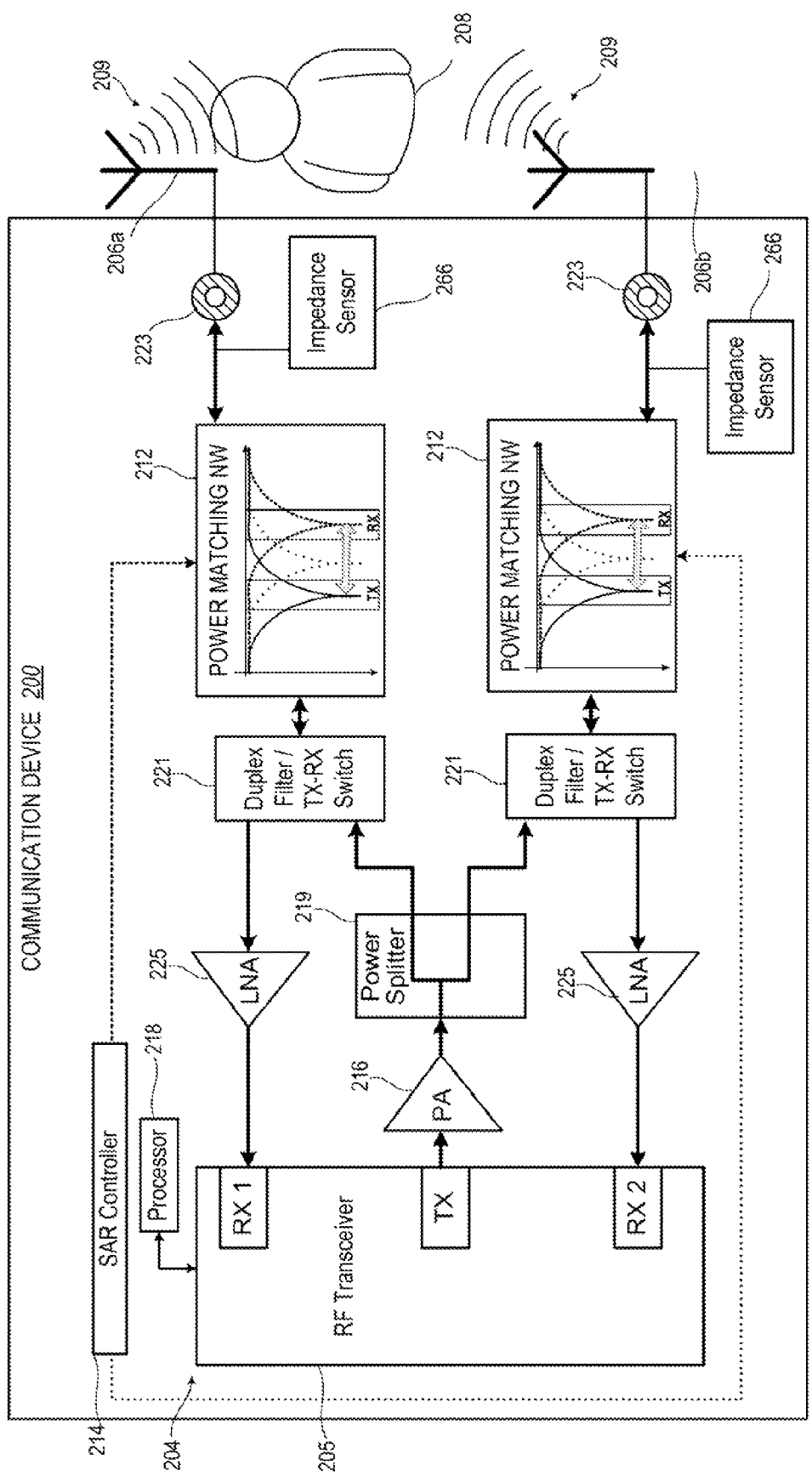
FIG. 2 illustrates a block diagram of backend components of the communication device of FIG. 1, according to one embodiment.

FIG. 2 illustrates a communication device 200 including an RF front end 204 that divides transmit power between multiple antennas 206a-206b for signal transmission. SAR controller 214 shifts the amount of transmit power between the multiple antennas 206a-206b in response to a user 208 being proximate to one of the antennas 206a-206b and thus subject to RF energy 209. RF front end 204 includes an RF transceiver 205 that communicates with a processor 218. Information for transmission from the processor 218 is converted into a communication signal that is transmitted from a TX port to a power amplifier 216 that amplifies the signal to a TRP level. The amplified communication signal is split by a power splitter 219 to two duplex switches or TX-RX switches 221. The amplified and split communication signals pass through respective power matching networks 212 that tune or detune respective antennas 206a-206b. Impedance detection sensors 266 are respectively coupled to each antenna 206a-206b to detect antenna loading. Each antenna 206a-206b is also in electrical communication to a respective calibration connection switch 223. The antennas 206a-206b can also receive communication signals based on tuning of the matching networks 212 to a receive (RX) channel rather than a transmit (TX) channel. Each duplex filter or TX-RX switch 221 routes any received communication signals from the assigned antenna 206a-206b to a corresponding RX input to the RF transceiver 205 via respective low noise amplifiers (LNA) 225. According to the disclosure, SAR controller 214 shifts the amount of transmit power between the multiple antennas 206a-206b in response to a user 208 being proximate to one of the antennas 206a-206b and thus subject to RF energy 209.

Figure 3:
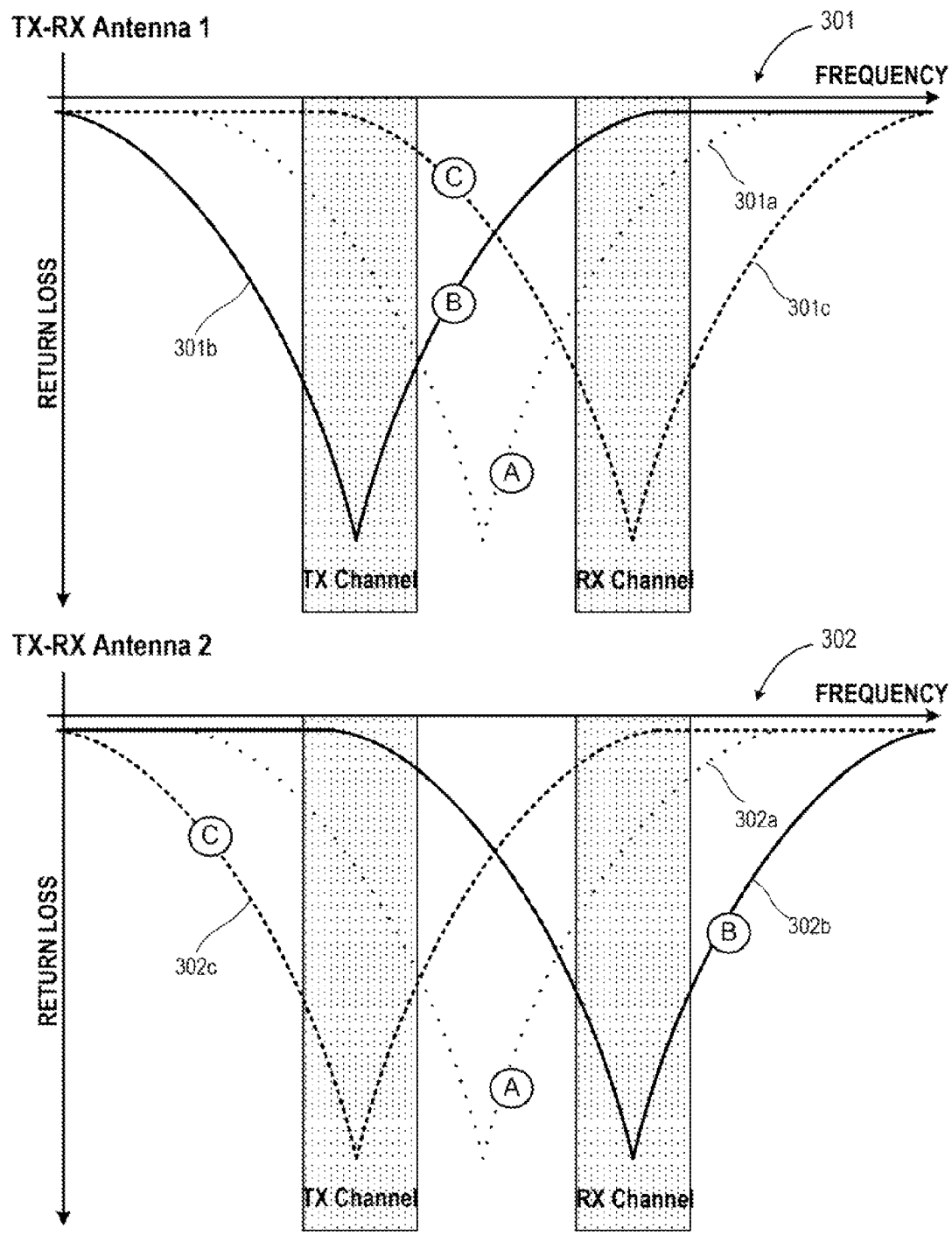
FIG. 3 illustrates linked graphical plots of frequency responses of two antennas of the communication device of FIG. 1, according to one embodiment.

FIG. 3 illustrates frequency versus return loss plots 301, 302 respectively for first and second TX-RX antennas. In a default matching network configuration, both antennas may be tuned for balanced TX-RX responses 301a, 302a, wherein each antenna is tuned between TX channel and RX channel. In response to detecting SAR exposure indication for the second TX-RX antenna, the matching networks can be tuned and detuned cooperatively to the responses 301b, 302b wherein the first TX-RX antenna is tuned to the TX channel and the second TX-RX antenna is tuned to the Rx channel. Thus the second TX-RX antenna is detuned from the TX channel to mitigate SAR exposure of a user. Similarly, in response to detecting SAR exposure indication for the first TX-RX antenna, the matching networks can be tuned and detuned cooperatively to the responses 301c, 302c, whereby the first TX-RX antenna is tuned to the RX channel and the second TX-RX antenna is tuned to the TX channel. Thus the first TX-RX antenna is detuned from the TX channel to mitigate SAR exposure of a user.

Figure 4:
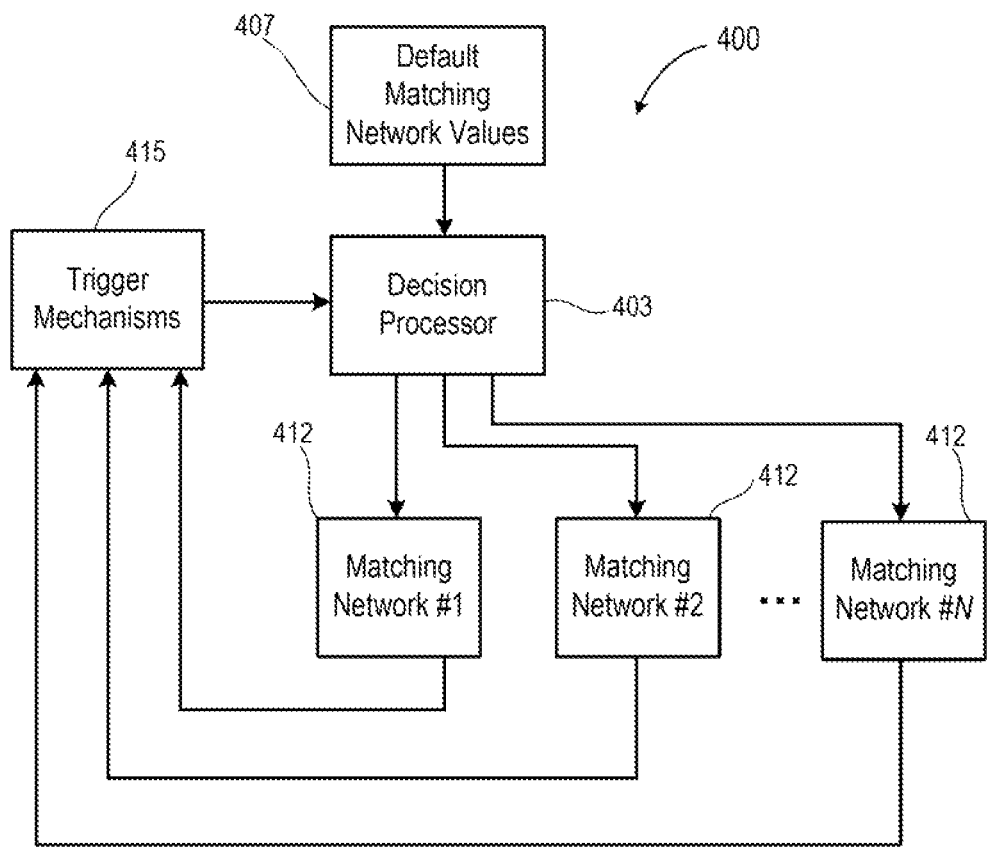
FIG. 4 illustrates a block diagram of a SAR controller that controls matching networks within the communication device, according to one embodiment.

FIG. 4 illustrates a SAR mitigation system 400 in which a decision processor 403 receives default matching network values 407 to control matching networks 412 that tune antennas as well as provides information to trigger mechanisms 415. When the trigger mechanisms 415 indicate SAR exposure, the decision processor 403 can tune and detune the matching networks 412 to mitigate SAR exposure.

Figure 5:
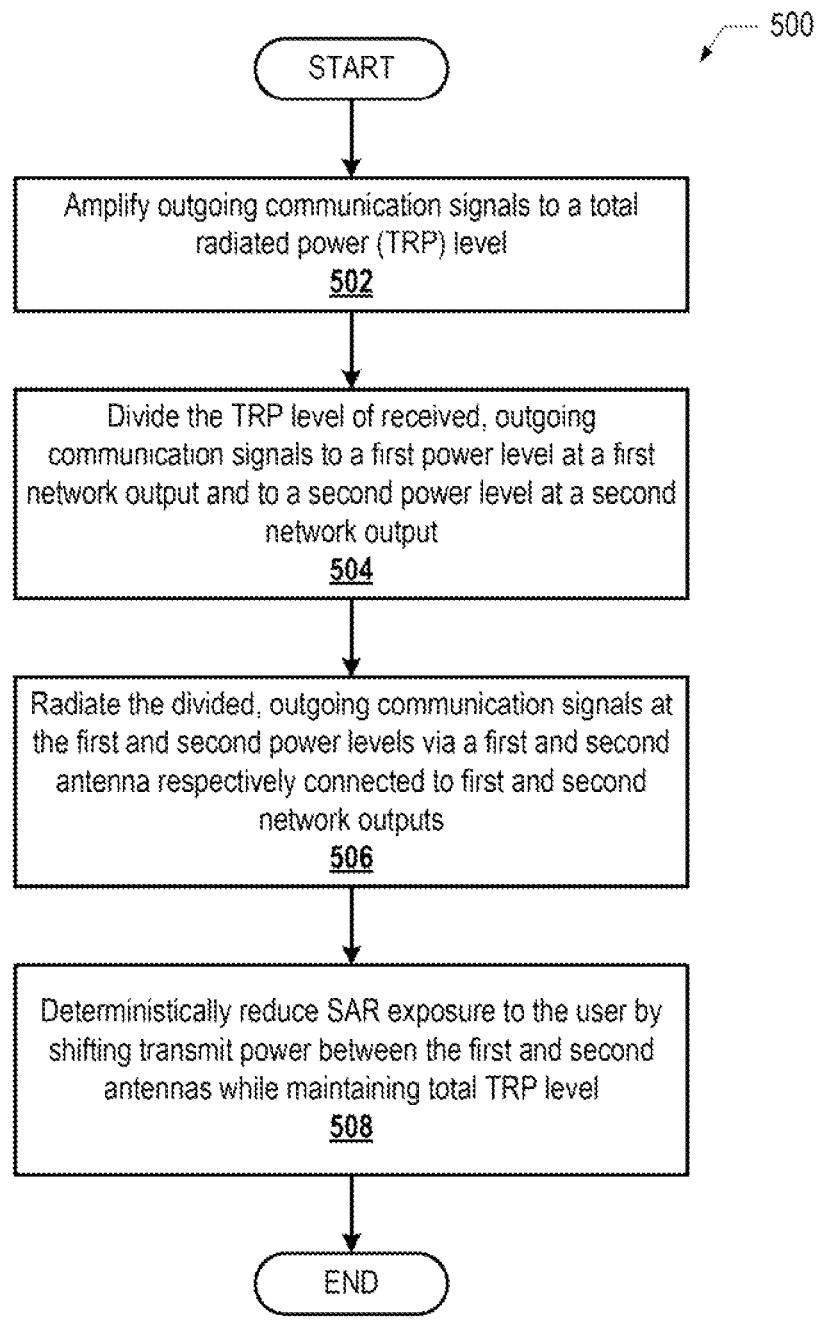
FIG. 5 illustrates a flow chart of an example method of shifting transmit power levels between two antennas of a communication device to mitigate SAR exposure of a user, according to one embodiment.

FIG. 5 illustrates a method of mitigating SAR exposure of a user by using matching networks of an RF front end of a communication device to cooperatively tune and detune a pair of antennas used for transmitting signals, according to one embodiment. The method 500 begins with the start block. The method 500 includes amplifying outgoing communication signals to a TRP level (block 502). The method 500 includes dividing the TRP level of received, outgoing communication signals into a first power level at a first network output and to a second power level at a second network output (block 504). The method 500 also includes radiating the divided, outgoing communication signals at the first and second power levels via a first and second antenna respectively connected to first and second network outputs (block 506). The method 500 further includes deterministically reducing SAR exposure to the user by shifting transmit power levels between the first and second antennas while maintaining the total TRP level (block 508). Method 500 then ends.

Figure 6:
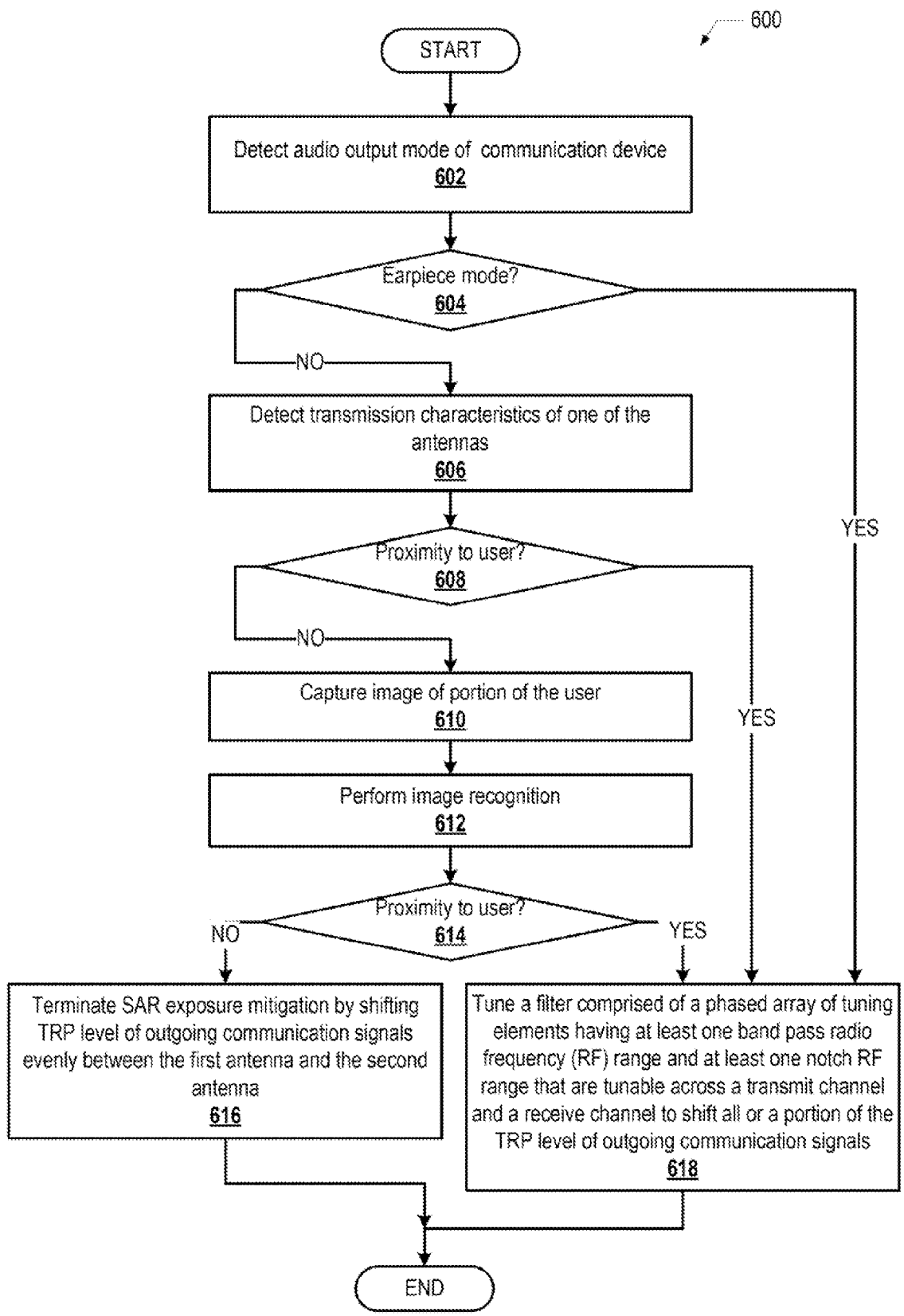
FIG. 6 illustrates a flow chart of an example method of determining an audio output mode of the communication device that is indicative of SAR exposure of the user, according to one embodiment.

FIG. 6 illustrates a method 600 of determining an audio output mode of the communication device that is indicative of SAR exposure of the user, according to one embodiment. The method 600 begins at the start block. The method 600 includes detecting an audio output mode of the communication device that includes a hands-free mode and an earpiece mode (block 602). SAR controller makes a determination whether the communication device is in an earpiece mode (decision block 604). In response to determining in decision block 604 that the communication device is not in an earpiece mode, the SAR controller detects transmission characteristics of the antennas (block 606). SAR controller makes a determination whether the transmission characteristic indicates proximity to user (decision block 608). For example, the user may have the communication device up to his head even though the output audio mode is loudspeaker or peripheral device. For another example, the communication device may be transmitting data for an application function and the user is holding the communication device close to his/her body. In response to a determination in decision block 608 that the transmission characteristics do not indicate proximity to the user, then an image recognition sensor of the communication device captures an image of a portion of the user within range of sensor (block 610). The captured image can be a visual, infrared, or other electromagnetic rendering. The image recognition sensor performs recognition of the captured image (block 612). SAR controller determines whether the image recognition sensor has detected proximity to the user (decision block 614). In response to a determination in decision block 614 that the image recognition sensor did not detect proximity to the user, SAR controller terminates any SAR exposure mitigation by shifting TRP level of outgoing communication signals evenly between the first and second antennas (block 616). Then method 614 ends.

In response to determining in decision block 604 that the communication device is in an earpiece mode, SAR controller tunes a matching network. In a particular embodiment, the SAR controller tunes a filter of a phased array of tuning elements having at least one band pass RF range and at least one notch RF range that are tunable across a transmit channel and a receive channel to shift all or a portion of the TRP level of outgoing communication signals (block 618). Similarly in response to determining in decision block 608 that the transmission characteristics indicate proximity to the user, SAR controller tunes a matching network of the filter of the phased array of tuning elements to shift all or a portion of the TRP level of outgoing communication signals from one antenna to the other antenna (block 618). Similarly in response to determining in decision block 614 that the image recognition sensor indicates proximity to the user, SAR controller tunes a matching network of the filter of the phased array of tuning elements to shift all or a portion of the TRP level of outgoing communication signals from one antenna to the other antenna (block 618). Then method 600 ends.

In the flow chart of FIGS. 5-6 presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A communication device, comprising:
   a radio frequency (RF) transmitter that amplifies outgoing communication signals to a total radiated power (TRP) level;
   a matching network electrically connected to the RF transmitter-that divides the TRP level of received, outgoing communication signals into a first power level at a first network output and to a second power level at a second network output;
   first and second antennas electrically connected respectively to the first and second network output and which radiate the divided, outgoing communication signals at the first and second power levels respectively; and
   a specific absorption rate (SAR) controller communicatively connected to the transmitter and the matching network and which controls the matching network to configure complete communication device TRP and total isotropic sensitivity (TIS) by configuring matching networks on a per antenna element basis while conforming to SAR limits.

2. The communication device of claim 1, further comprising an audio output mode selection (AOMS) module that enables selection of an audio output mode from among an earpiece mode and a hands-free mode, and wherein the SAR controller is communicatively connected to the AOMS module and determines SAR exposure of a user based on the audio output mode being the earpiece mode.

3. The communication device of claim 2, further comprising an audio speaker and a wireless mechanism for connecting to a wireless audio device, wherein the earpiece mode corresponds to use of the audio speaker and the hands-free mode corresponds to use of the wireless mechanism and paired wireless audio device.

4. The communication device of claim 1, further comprising:
   a processor;
   a camera that captures images representing a portion of the user that is proximate to the device; and
   a usage mode identification (UMI) utility executing on the processor and which receives the captured images and identifies from the captured images whether the communication device is being utilized in one of a hands free mode and an earpiece mode.

5. The communication device of claim 1, further comprising a sensor connected to one of the first and second antennas and communicatively connected to the SAR controller, and which detects a transmission characteristic that is indicative of SAR exposure to the user, wherein the SAR controller receives the sensed transmission characteristic from the sensor and utilizes the sensed transmission characteristic to determine SAR exposure to the user.

6. The communication device of claim 5, wherein the sensor comprises an impedance sensor that detects an impedance loading of at least one of the first and second antennas due to a proximity of the user.

7. The communication device of claim 5, wherein the sensor comprises a capacitive sensor that changes capacitance based on a proximity of the user.

8. The communication device of claim 1, wherein the matching network comprises a tuning filter having at least one band pass RF range and at least one notch RF range that are tunable across a transmit channel and a receive channel.

9. The communication device of claim 1, wherein the matching network comprises a phased array of tuning elements.

10. The communication device of claim 1, wherein the SAR controller causes the matching network to shift all transmit power levels to a selected transmit antenna from among the first antenna and the second antenna and to receive incoming communication signals via another one of the first antenna and the second antenna that is not selected as the transmit antenna.

11. The communication device of claim 10, wherein:
the matching network comprises at least one of a PIN diode switch, a varactor element, and a capacitor bank; and
the SAR controller causes the antenna not selected as the transmit antenna to be switched off for transmitting by controlling an included one of the PIN diode switch, the varactor element, and the capacitor bank within the matching network.

12. The communication device of claim 1, wherein the SAR controller terminates SAR exposure mitigation by shifting the TRP level of outgoing communication signals evenly between the first antenna and the second antenna.

13. A method for mitigating specific absorption rate (SAR) exposure of a user of a communication device, the method comprising:
amplifying outgoing communication signals to a total radiated power (TRP) level;
dividing the TRP level of received, outgoing communication signals into a first power level at a first network output and to a second power level at a second network output;
radiating the divided, outgoing communication signals at the first and second power levels via a first and second antenna respectively connected to first and second network outputs; and
deterministically configuring complete communication device TRP and total isotropic sensitivity (TIS) by configuring matching networks on a per antenna element basis while conforming to SAR limits.

14. The method of claim 13, further comprising:
outputting audio for the user in an audio output mode that enables selection of an audio output mode from among an earpiece mode and a hands-free mode; and
determining SAR exposure of the user based upon the audio output mode being the earpiece mode.

15. The method of claim 13, further comprising:
capturing images representing a portion of the user that is proximate to the device; and
identifying from the captured images whether the communication device is being utilized in one of a hands free mode and an earpiece mode.

16. The method of claim 13, further comprising detecting a transmission characteristic indicative of SAR exposure to the user by utilizing changes in one of impedance loading and capacitance of at least one of the first and second antennas.

17. The method of claim 13, wherein shifting the transmit power levels comprises tuning a filter comprised of a phased array of tuning elements having at least one band pass RF range and at least one notch RF range that are tunable across a transmit channel and a receive channel.

18. The method of claim 13, wherein shifting transmit power levels comprises shifting all transmit power levels to a selected transmit antenna from among the first antenna and the second antenna and receiving incoming communication signals via another one of the first antenna and the second antenna that is not selected as the transmit antenna.

19. The method of claim 18, wherein shifting all transmit power levels comprises controlling one of a PIN diode switch, a varactor element, and a capacitor bank within a matching network.

20. The method of claim 13, further comprising terminating SAR exposure mitigation by applying the TRP level of outgoing communication signals evenly between the first antenna and the second antenna.

* * * * *